US010436270B2

(12) United States Patent
Stoeger et al.

(10) Patent No.: US 10,436,270 B2
(45) Date of Patent: Oct. 8, 2019

(54) DISC BRAKE FOR A COMMERCIAL VEHICLE

(71) Applicant: KNORR-BREMSE Systeme fuer Nutzfahrzeuge GmbH, Munich (DE)

(72) Inventors: Christian Stoeger, Osterhofen (DE); Stefan Huber, Aldersbach (DE); Christian Menz, Passau (DE); Andreas Rentschler, Deggendorf (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 44 days.

(21) Appl. No.: 15/718,493

(22) Filed: Sep. 28, 2017

(65) Prior Publication Data
US 2018/0017118 A1    Jan. 18, 2018

Related U.S. Application Data

(63) Continuation of application No. PCT/EP2016/056289, filed on Mar. 22, 2016.

(30) Foreign Application Priority Data

Mar. 31, 2015 (DE) ........................ 10 2015 104 916

(51) Int. Cl.
*F16D 66/02* (2006.01)
*F16D 55/226* (2006.01)
(Continued)

(52) U.S. Cl.
CPC ............. *F16D 66/02* (2013.01); *B60T 1/065* (2013.01); *B60T 17/221* (2013.01);
(Continued)

(58) Field of Classification Search
CPC ........... B60T 17/22; F16D 66/02; F16D 55/40
(Continued)

(56) References Cited

U.S. PATENT DOCUMENTS 4,356,897 A * 11/1982 Urban .................... F16D 55/224
                                                          188/1.11 W
4,460,067 A *  7/1984 Katagiri ................. F16D 66/02
                                                          188/1.11 W
(Continued)

FOREIGN PATENT DOCUMENTS

DE      36 12 166 C2    5/1995
DE      601 09 332 T2   3/2006
(Continued)

OTHER PUBLICATIONS

International Search Report (PCT/ISA/210) issued in PCT Application No. PCT/EP2016/056289 dated Jun. 7, 2016 with English-language translation (five (5) pages).
(Continued)

*Primary Examiner* — Christopher P Schwartz
(74) *Attorney, Agent, or Firm* — Crowell & Moring LLP

(57) ABSTRACT

A disc brake, having a brake caliper which engages over a brake disc, is held on a stationary brake carrier such that it can be displaced axially in relation to the brake disc, and in which brake pads are positioned which, during a braking operation, can be pressed against the brake disc by a brake application device. A device for visual wear detection of brake disc wear and/or brake lining wear is provided, and is configured in such that, for wear detection, a comparison element which extends in the displacement direction of the brake caliper and in an opposed manner with respect to the brake disc is fastened to the brake carrier. The comparison element is of strip-shaped configuration, with continuously planar side surfaces, and has at least one step on the edge side in the displacement direction of the brake caliper.

11 Claims, 4 Drawing Sheets

(51) Int. Cl.
 B60T 1/06 (2006.01)
 B60T 17/22 (2006.01)
(52) U.S. Cl.
 CPC ......... *F16D 55/226* (2013.01); *F16D 66/026* (2013.01); *F16D 66/028* (2013.01)
(58) Field of Classification Search
 USPC ......... 188/1.11 R, 1.11 W; 116/208; 340/454
 See application file for complete search history.

(56) References Cited

U.S. PATENT DOCUMENTS

| | | | | |
|---|---|---|---|---|
| 4,498,559 | A * | 2/1985 | Katagiri | F16D 66/02 |
| | | | | 116/208 |
| 4,658,936 | A * | 4/1987 | Moseley | F16D 55/40 |
| | | | | 116/208 |
| 4,989,537 | A * | 2/1991 | Hutchinson, Sr. | F16D 66/02 |
| | | | | 116/208 |
| 4,991,310 | A * | 2/1991 | Melia | F16D 66/02 |
| | | | | 116/208 |
| 5,538,103 | A * | 7/1996 | Rueckert | F16D 55/227 |
| | | | | 188/1.11 L |
| 6,904,698 | B2 * | 6/2005 | Halliar | B60T 17/08 |
| | | | | 116/208 |
| 8,540,060 | B2 * | 9/2013 | Hayashi | F16D 65/097 |
| | | | | 188/1.11 W |
| 8,717,159 | B2 * | 5/2014 | Todd | B60T 17/221 |
| | | | | 340/454 |
| 8,752,678 | B2 * | 6/2014 | Gruber | F16D 66/025 |
| | | | | 116/208 |
| 9,038,784 | B2 * | 5/2015 | Boyle | B60T 17/22 |
| | | | | 188/1.11 W |
| 9,511,755 | B2 * | 12/2016 | Seglo | B60T 17/22 |
| 2011/0186391 | A1 | 8/2011 | Gruber et al. | |

FOREIGN PATENT DOCUMENTS

| | | |
|---|---|---|
| DE | 10 2008 034 653 A1 | 1/2010 |
| DE | 10 2009 025 875 A1 | 12/2010 |
| WO | WO 03/046404 A1 | 6/2003 |

OTHER PUBLICATIONS

German-language Written Opinion (PCT/ISA/237) issued in PCT Application No. PCT/EP2016/056289 dated Jun. 7, 2016 (five (5) pages).

* cited by examiner

DISC BRAKE FOR A COMMERCIAL VEHICLE

CROSS REFERENCE TO RELATED APPLICATIONS

This application is a continuation of PCT International Application No. PCT/EP2016/056289, filed Mar. 22, 2016, which claims priority under 35 U.S.C. § 119 from German Patent Application No. 10 2015 104 916.3, filed Mar. 31, 2015, the entire disclosures of which are herein expressly incorporated by reference.

BACKGROUND AND SUMMARY OF THE INVENTION

The invention relates to a disc brake for a commercial vehicle having a brake caliper which straddles a brake disc. The caliper is held on a stationary brake carrier such that it can be moved axially in relation to the brake disc. Brake pads are positioned in the caliper. During a braking operation, the brake pads can be pressed against the brake disc by way of a brake application device. A device for visual wear detection of brake disc wear and/or brake pad wear is provided.

In order to monitor the operating safety of a disc brake, there are wear systems which monitor the wear of the brake pads and/or of the brake disc, ensuring that necessary replacement of the relevant components takes place at the best possible point-in-time. Here, the state of wear of the brake pads should be established as accurately as possible.

For reasons of cost, replacement of the brake pads at an optimum point-in-time is required, the aim being to perform replacement only when the respective friction lining material of the brake pads has been worn down to a permissible minimum thickness. Earlier replacement would conflict with the constant striving to optimize operating costs, while replacing them too late would entail compromising the functional reliability of the disc brake overall.

Various design solutions are known for detecting the state of wear of the brake pads. Thus, there is a wear indicator in use in which a current-carrying cable is passed through the pad carrier plate. This cable is severed when the friction lining is worn. The severing is detectable from a signal in a signal transmitter usually arranged in the driver's cab of the motor vehicle.

In addition, the prior art includes wear indicators which use a rotary potentiometer to determine a travel distance of a wear adjusting device, which travel arises during adjustment of the brake pads to compensate for a wear-induced change in the release clearance, i.e. the distance between the brake pad and the brake disc. This can likewise be recognized, by the driver of the vehicle for example, from an indicator.

For direct visual detection of the state of wear of the brake pads, use is made of a device of the type in question, which has a spring-loaded pin which is guided in the brake caliper and by which a wear-induced adjustment of the brake caliper can be detected.

However, the implementation of a wear indicator of this kind is associated with considerable structural complexity, as is that of the other known wear indicators. For example, expensive machining of the brake caliper is required for guidance of the pin.

The electric wear indicators mentioned can only be implemented with a considerable outlay on equipment and, furthermore, do not guarantee absolutely reliable operation owing to the rough operating conditions in which commercial vehicles are used in many cases.

For visual detection of the state of wear of the brake pads and/or of the brake disc, there is a proposal in DE 36 12 166 C2 to provide the brake carrier with a marking, which is used in correspondence with a correspondingly modified pad carrier plate for wear detection.

In this case, the marks on the brake carrier are produced by corresponding shaping, in particular by U- or V-shaped recesses in the sense of notches.

However, such recesses and indeed other necessary shapings affect the strength of the brake carrier, wherein the notches, in particular, lead to a reduction in fatigue strength.

Common to all devices for wear detection is the fact that they are visible essentially only when the vehicle wheel is removed, and this conflicts with the desired simplicity of use of the device.

It is the underlying object of the invention to develop a disc brake of the type in question in such a way that simple, reliable and accurate indication of the wear of the brake pad is possible with little design and manufacturing outlay.

This object is achieved by a disc brake having a brake caliper, which straddles a brake disc, is held on a stationary brake carrier such that it can be moved axially in relation to the brake disc, and in which brake pads are positioned. During a braking operation, the brake pads can be pressed against the brake disc by way of a brake application device. A device for visual wear detection of brake disc wear and/or brake pad wear is provided. For wear detection, a comparison element, which extends in the direction of movement of the brake caliper and oppositely to the brake disc, is secured on the brake carrier. The comparison element is of strip-shaped design, with continuously planar side surfaces, and has at least one step on the edge side in the direction of movement of the brake caliper.

The strip-shaped comparison element, which, according to the invention, is secured on the brake carrier, preferably by latching, extends in the direction of movement of the brake caliper and oppositely to the brake disc and has at least one step on the edge side in the direction of movement of the brake caliper, is particularly simple and economical to produce and assemble.

This results in a considerable cost reduction as compared with the wear contacts mentioned above or with continuous wear sensing by the potentiometer described above.

Since, as mentioned, wearing parts, e.g. sliding contacts, are no longer used, there is also no abrasion, which otherwise proves disadvantageous in respect of environmental pollution.

Moreover, accurate indication of the state of wear of the brake pads and the brake disc is possible from the outside without removing the wheel rim. At the same time, this type of indication is unproblematic insofar as it does not require wearing parts, thus resulting in high reliability.

Detection of intermediate states of wear at predetermined intervals, e.g. at 50% intervals, can be achieved if a plurality of steps is provided, ensuring that an adequate estimate of the state of wear is possible at all times without problems.

According to the underlying principle, visual detectability of the state of wear of the brake pads and the brake disc is accomplished in correspondence with an edge of the brake caliper which is recognizably aligned with the corresponding step when a minimum permissible thickness of the friction lining is reached.

Since the comparison element is in the form of a separate component, it is not necessary to change the brake carrier or other components of the brake disc.

Another aspect of the invention produces the comparison element from a metal sheet, wherein at least one latching element, which engages in a latching opening in the brake carrier, is formed on a holding bracket.

Adjoining the holding bracket there are preferably two limbs, which are arranged parallel to and at a distance from one another and into which the steps are introduced. This embodiment is distinguished, in particular, by the fact that assembly can be performed manually in an extremely simple manner and does not require any additional assembly station.

If the comparison element is damaged or lost during operation, a replacement part can be secured without significant effort, given such an assembly.

One aspect which may be emphasized as particularly advantageous is the, in principle, universal applicability of the novel comparison element, which makes it possible to carry out retrofitting of a disc brake already mounted on the vehicle with a comparison element according to the invention.

As an alternative to the indicated selection of material for the comparison element, comprising sheet metal, it can also be produced from a plastic part or from a metal/plastic composite.

Instead of a brake caliper edge corresponding to the comparison element, it is also possible for other shapes to be used as references if they can be seen in correspondence with the comparison element in the manner described without removing the wheel rim.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
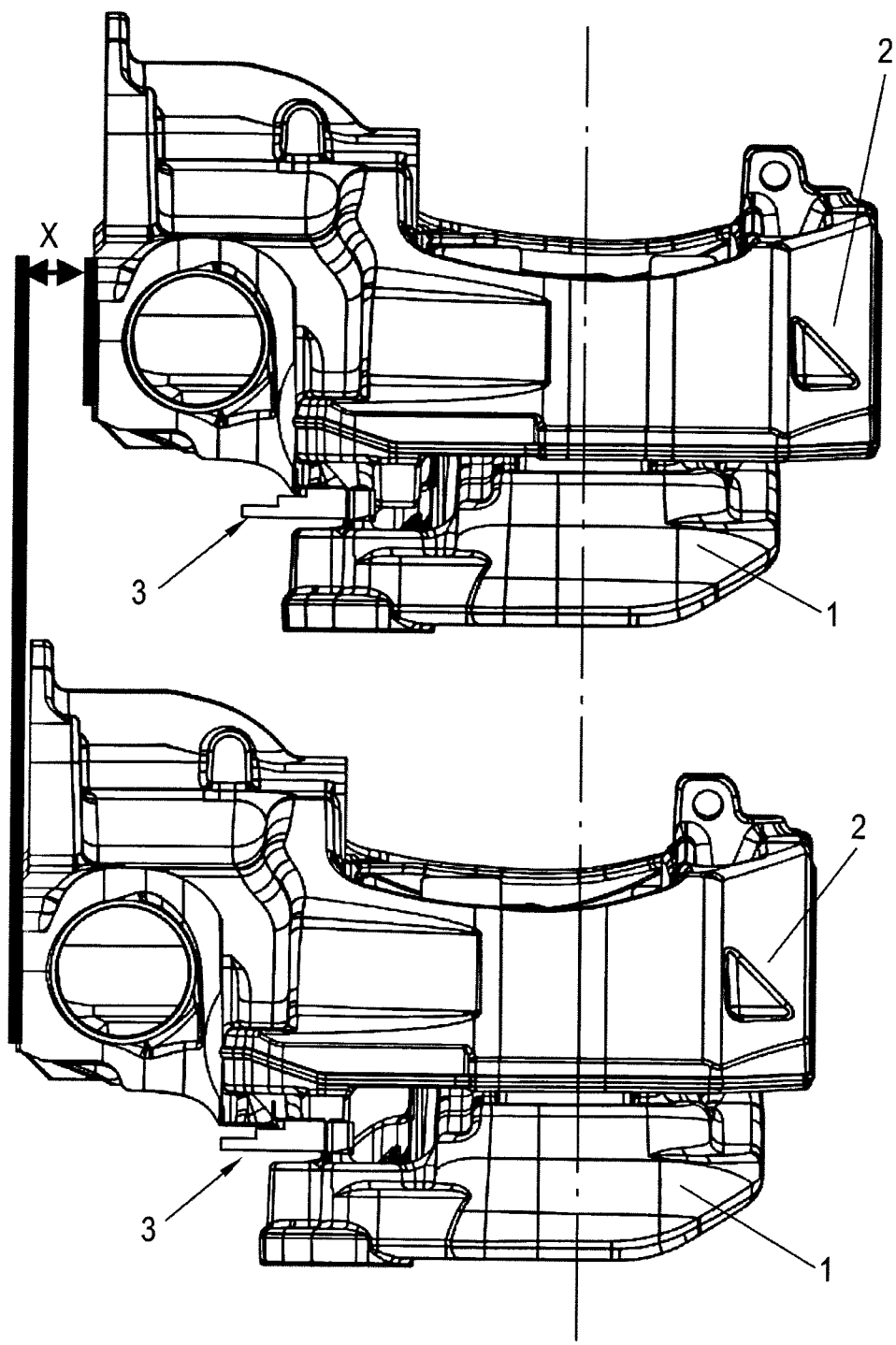
FIG. 1 shows a part of a disc brake according to an embodiment of the invention in different wear-induced positions.

FIG. 1 shows a disc brake caliper 2, designed as a floating caliper, on a vehicle-mounted brake carrier 1. The brake caliper straddles a brake disc (not shown). The brake caliper 2 is held on the brake carrier 1 in such a way that it can be moved axially in relation to the brake disc, for which purpose guide spars connected to the brake carrier 1 are provided.

Arranged in the brake caliper 2 and in the brake carrier 1 are two brake pads (likewise not shown), which can be pressed against the brake disc during a braking operation by means of a brake application device positioned in the brake caliper 2. Each brake pad has a pad carrier plate and a friction lining, which friction lining makes contact with the brake disc in the case of a braking operation.

This friction lining, and likewise the brake disc, are subject to wear in the sense of abrasion, as a result of which the position of the brake caliper 2 relative to the brake carrier 1 changes. This amount of wear is indicated by X in FIG. 1, wherein the upper image shows the position of the brake caliper 2 with unworn (new) brake pads and the lower image shows it with brake pads worn down to a minimum thickness.

To monitor the wear but, above all, to detect when a permissible wear limit is reached, a wear detection system is provided. According to the invention, the wear detection system consists of a strip-shaped comparison element 3, which extends in the direction of movement of the brake caliper 2 and oppositely to the brake disc.

Figure 2:
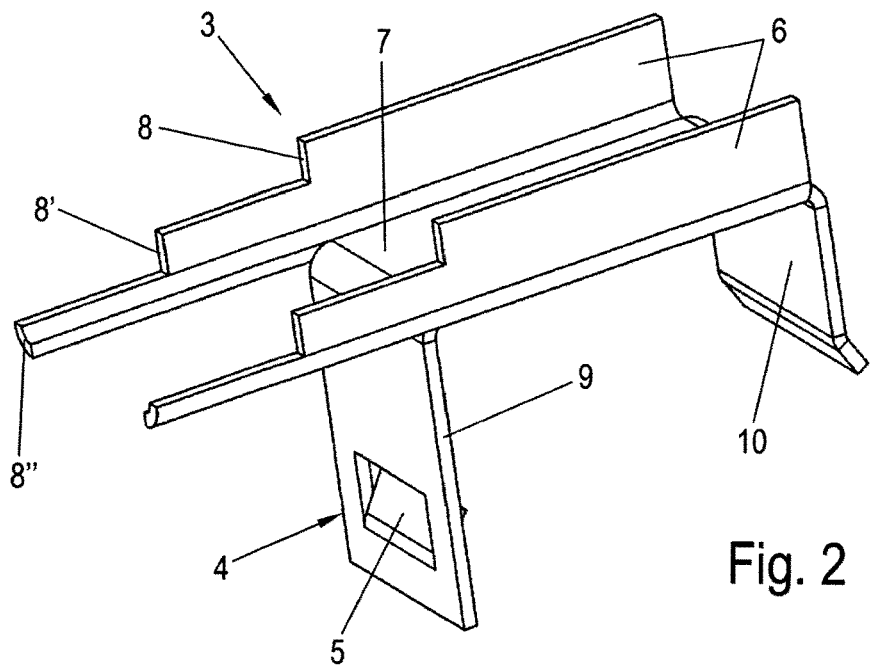
FIG. 2 shows a detail of the wear detection system of the disc brake in a perspective view.
Figure 3:
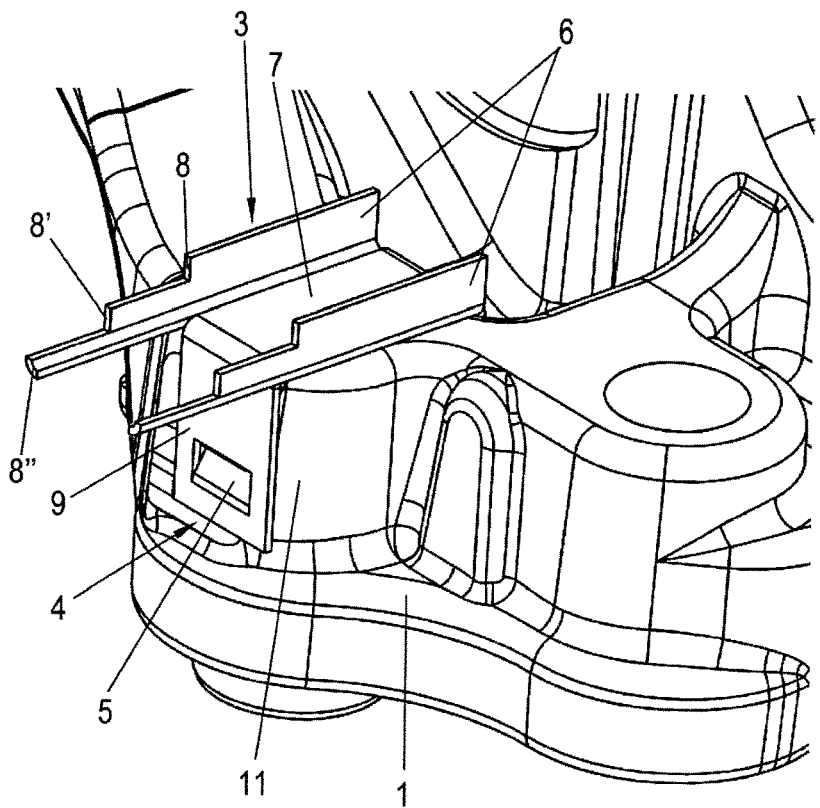
FIG. 3 shows a further detail according to FIG. 2 in the assembled position, like-wise shown in perspective.

In this case, the comparison element 3, which is shown in detail in FIG. 2, is secured on the brake carrier 1 and designed as a formed sheet-metal part.

In this illustrative embodiment, the comparison element 3 has two limbs 6, which are arranged parallel to and at a distance from one another. The limbs 6 have continuously planar lateral surfaces and are provided on an edge with two steps 8, 8'.

While a first step 8 in the direction of movement of the brake caliper 2 shows the position of a new, i.e. unworn, brake pad relative to the brake carrier 1, approximately 50% wear of the friction lining is detectable when a reference edge of the brake caliper with respect to the second step 8' is reached.

The reaching of the maximum permissible wear limit is visible from the alignment of the free end 8" of the limb 6 with the reference edge of the brake caliper 2.

As mentioned, two limbs 6 arranged parallel to and at a distance from one another are provided in the example shown in FIG. 2, said limbs being connected to one another by a web 7. The web 7, in turn, is part of a holding bracket 4, which is latched to the brake carrier. In this case, the comparison element is of mirror-symmetrical configuration in its extension direction. Instead of two limbs 6, the operation of the comparison element 3 is also achieved with just one limb 6, which is adjoined, preferably at right angles thereto, by the web 7.

Figure 5A:
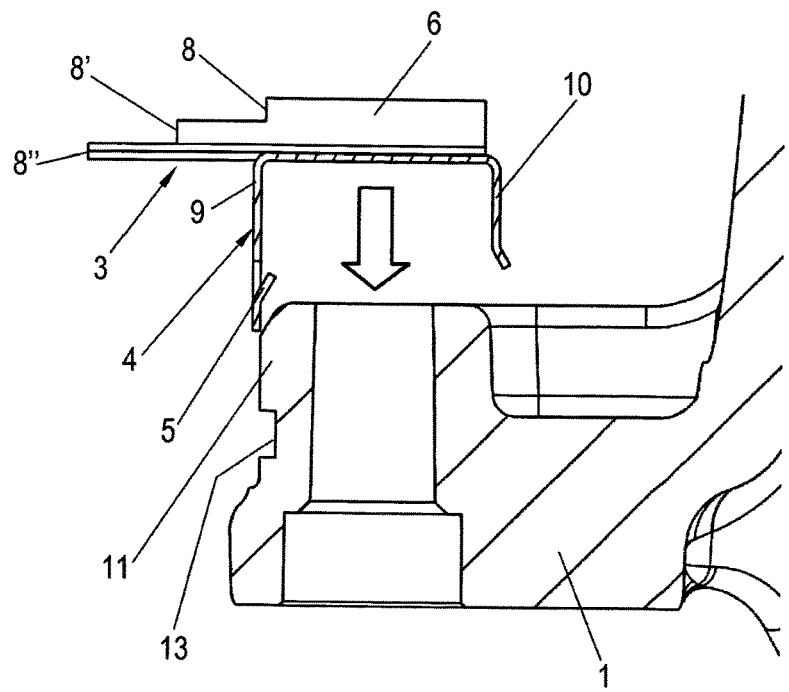
FIGS. 5A and 5B show other enlarged segments in different assembly positions of the detail shown in FIG. 2.
Figure 5B:
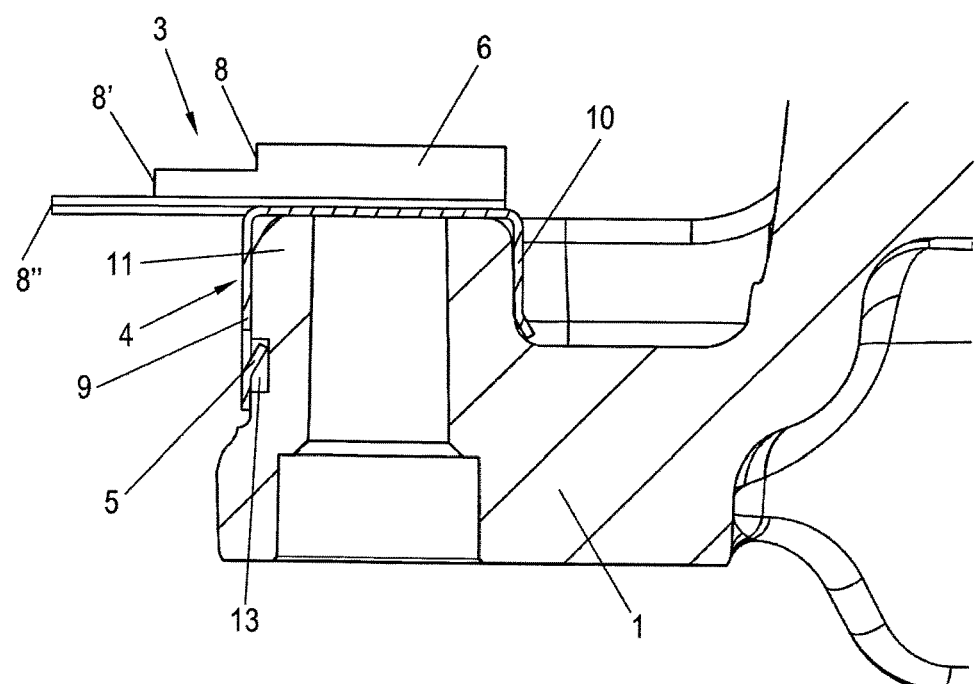

To secure the holding bracket 4, two legs 9, 10 arranged parallel to and at a distance from one another and, together with the web 7, describing a U-shaped contour, are integrally formed. One leg 9 has a latching element shaped as a barb 5, which engages positively in a recess 13 in a connection protuberance 11 of the brake carrier 1. This can be seen clearly particularly in FIGS. 5A and 5B, wherein FIG. 5A shows a position before the mounting of the comparison element 3 on the connection protuberance 11. FIG. 5B, in contrast, shows the fully mounted comparison element 3 latched to the connection protuberance 11.

Instead of positive engagement, there is also the possibility of connecting the comparison element 3 to the brake carrier 1 by screw fastening, for example, wherein the holding bracket 4 or a comparable fastening part as well as the connection hump 11 must be correspondingly modified for this purpose.

Figure 4A:
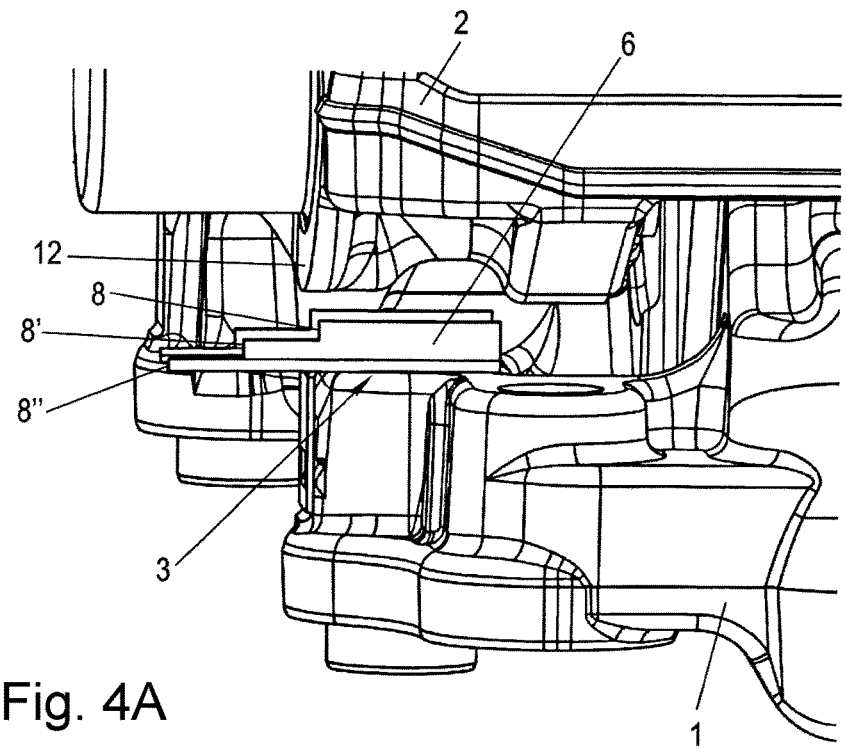
FIGS. 4A and 4B show enlarged segments of the disc brake shown in FIG. 1.
Figure 4B:
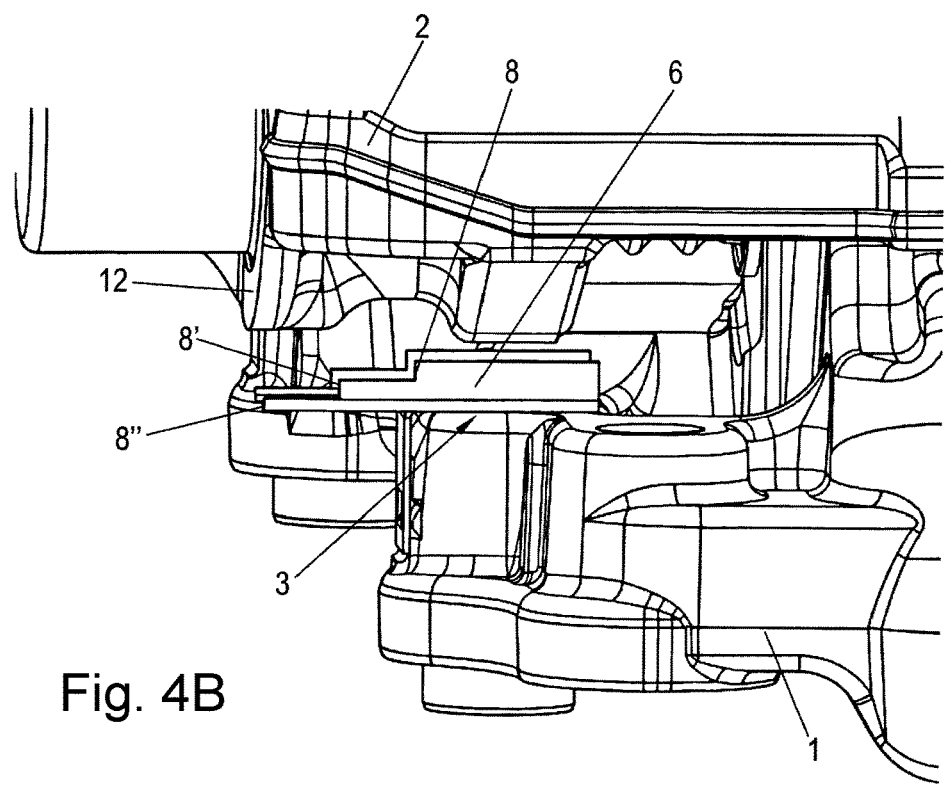

In FIGS. 4A and 4B, the comparison element 3 can be seen in respect of the various positions of the brake caliper 2 before and after a wear-induced movement.

Here, FIG. 4B shows the position which the brake caliper 2 occupies upon reaching a permissible wear limit of the brake pads, in which one edge 12 of the brake caliper 2 is aligned visually with the free end 8" of the comparison element 3.

FIG. 4A illustrates the position of the brake caliper 2 in which the brake pads have not yet been subject to stress in the sense of abrasion. Here, the edge 12 is in alignment with the first step 8, this being readily and clearly visible to an observer from the outside. Thus, the distance between the first step 8 and the offset free end 8" of the limb 6 corresponds to the distance X in FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for use with a brake disc, wherein brake pads are positioned in the disk brake, the disc brake comprising:
    a brake caliper configured to straddle the brake disc when in use;
    a stationary brake carrier on which the brake caliper is mounted so as to be displaceable axially in relation to the brake disc, wherein during a braking operation, the brake pads are pressable against the brake disc via a brake application device;
    a comparison element for visual wear detection of brake pad wear and/or brake disc wear, wherein
        the comparison element extends in a movement direction of the brake caliper and oppositely to the brake disc,
        the comparison element is secured on the brake carrier, and
        the comparison element has a strip-shaped configuration, with continuously planar side surfaces, and has at least one step on an edge side in the movement direction of the brake caliper, and
        a distance in the direction of movement of the brake caliper from the at least one step to a free end of the comparison element corresponds to a maximum permissible amount of wear.
2. The disc brake as claimed in claim 1, wherein the comparison element has a limb on which the at least one step is a notch.
3. The disc brake as claimed in claim 2, wherein the comparison element has a second limb arranged parallel to and at a distance from the limb, the second limb being provided with at least one step.
4. The disc brake as claimed in claim 3, wherein the comparison element has a web, which connects two legs of a U-shaped holding bracket to one another, and is formed at an angle on at least one of the two limbs.
5. The disc brake as claimed in claim 4, wherein the holding bracket is latched to the brake carrier.
6. The disc brake as claimed in claim 5, wherein one leg of the holding bracket has a latching element, which engages in a recess in the brake carrier.
7. The disc brake as claimed in claim 6, wherein the latching element is a barb.
8. The disc brake as claimed in claim 4, wherein the holding bracket is secured on a connection protuberance of the brake carrier.
9. The disc brake as claimed in claim 3, wherein the comparison element is of mirror-symmetrical design in an extension direction when embodied with the two limbs.
10. The disc brake as claimed in claim 1, wherein the comparison element is formed from a part made of metal, plastic or a combination of both materials.
11. The disc brake as claimed in claim 1, wherein the edge side includes a second step that corresponds to a defined amount of wear.

* * * * *